United States Patent [19]

Wohlforth

[11] Patent Number: 5,105,327
[45] Date of Patent: Apr. 14, 1992

[54] AC POWER CONDITIONING CIRCUIT

[75] Inventor: E. Brian Wohlforth, Quaker Hill, Conn.

[73] Assignee: USES, Inc., Quaker Hill, Conn.

[21] Appl. No.: 521,577

[22] Filed: May 10, 1990

[51] Int. Cl.⁵ ............................................. H02H 9/04
[52] U.S. Cl. .................................... 361/56; 323/208; 336/174; 336/184
[58] Field of Search ............ 361/50, 54, 56, 58, 361/111, 113, 118; 323/212, 214, 218, 208; 333/177, 181, 185; 307/105, 154, 157; 336/174, 173, 184

[56]  References Cited

U.S. PATENT DOCUMENTS

| | | | |
|---|---|---|---|
| 4,117,524 | 9/1978 | Parton et al. | 361/58 |
| 4,152,743 | 5/1979 | Comstock | 361/56 |
| 4,259,705 | 3/1981 | Stifter | 361/56 |
| 4,531,085 | 7/1985 | Mesenhimer | 323/214 |
| 4,584,622 | 4/1986 | Crosby et al. | 361/56 |
| 4,587,588 | 5/1986 | Goldstein | 361/54 |
| 4,672,298 | 6/1987 | Rohatyn | 323/208 |
| 4,739,436 | 4/1988 | Stefani et al. | 361/56 |
| 4,760,485 | 7/1988 | Ari et al. | 361/54 |
| 4,777,555 | 10/1988 | Esculpavit et al. | 361/56 |
| 4,802,055 | 1/1989 | Beckerman | 361/56 |
| 4,845,580 | 7/1989 | Kitchens | 361/91 |
| 4,866,560 | 9/1989 | Allina | 361/104 |
| 4,870,528 | 9/1989 | Harford | 361/56 |
| 4,870,534 | 9/1989 | Harford | 361/58 |
| 4,901,183 | 2/1990 | Lee | 361/56 |
| 5,012,218 | 4/1991 | Haug et al. | 336/174 |

FOREIGN PATENT DOCUMENTS 3508495 9/1986 Fed. Rep. of Germany ...... 336/174

Primary Examiner—Geoffrey S. Evans
Attorney, Agent, or Firm—Barry R. Lipsitz

[57] ABSTRACT

A power conditioner for AC power lines has a choke and capacitor coupled in series across the power lines. The choke comprises a coil terminating in a line, with the line looped back through the coil. The power lines are thereby balanced to provide greater operating efficiency. Capacitors and transient suppressors (e.g., varistors) are used for transient suppression and power factor correction.

23 Claims, 5 Drawing Sheets

AC POWER CONDITIONING CIRCUIT

BACKGROUND OF THE INVENTION

The present invention relates to the distribution of AC power, and more particularly to apparatus for conditioning the power delivered and reducing energy usage.

Transient surges are common on all power systems. Lightning, generator switching, and major power line shorts are examples of externally generated surges. Transients up to twice the applied voltage are common and up to 50 times the applied voltage have been observed.

More common and more frequent are transient surges caused by inductive load devices such as motors, transformers, relay coil and fluorescent light ballasts. These are known as internally generated surges.

Various transient voltage surge suppressors are well known in the art. U.S. Pat. Nos. 4,152,743; 4,259,705; 4,584,622; 4,587,588; 4,739,436; 4,760,485; 4,777,555; 4,802,055; 4,845,580; 4,866,560; 4,870,528; 4,870,534; and 4,901,183 illustrate various transient voltage suppression systems, surge suppressors, and filters for use in the distribution of electrical power. These patents disclose circuits that use devices such as capacitors and varistors between power lines together with chokes in series with the power lines to filter AC power. None of these references discloses or suggests the provision of inductors across power lines or across a power line and the neutral line of a power source. These patents also fail to disclose apparatus for substantially reducing energy consumption.

Any load that requires a magnetic field to operate, for example motors, transformers, fluorescent lamp ballasts, solenoids, and the like will cause the phase relationship between voltage and current supplied by the utility to change. Such phase shifting reduces the efficiency of the load, resulting in increased power consumption.

The phase angle between voltage and current is called power factor. Inductive circuits have a lagging power factor because the current lags the voltage. Capacitive circuits have a leading power factor because the current leads the voltage. It is desirable to make the angle between voltage and current approach zero. When voltage and current are in phase, the power factor is unity and the most efficient utilization of the power distribution system is obtained.

It would be advantageous to provide apparatus for conditioning AC power to eliminate transients and surges and reduce the energy consumed by inductive and capacitive loads. It would be further advantageous if such apparatus improved the power factor at one or more loads coupled to an AC power distribution system. The present invention provides such apparatus.

SUMMARY OF THE INVENTION

In accordance with the present invention, a power conditioner is provided for AC power lines. Various embodiments are disclosed, including circuits for use with both single phase and three phase service. In a two-line, single phase embodiment a first path contains a first choke in series with a capacitor. A second path contains a second choke in series with a capacitor. Means are provided for coupling the first path from a first line of an AC power source to a neutral of said source. Means are provided for coupling the second path from a second line of the source to the neutral. The first choke comprises a coil with a winding around the second path. Similarly, the second choke comprises a coil with a winding around the first path. Portions of the first and second chokes may be wound around a ferromagnetic core. The first choke can comprise a coil having a first portion wound around the core and said second path together with a second portion wound only around the second path. The second choke can comprise a coil having a first portion wound around said core and said first path together with a second portion wound only around the first path.

The power conditioner can further comprise means for coupling a capacitor between the first and second lines and means for coupling a transient suppressor between the first and second lines. A transient suppressor can also be coupled between the first line and neutral and between the second line and neutral. Additional transient suppressors can be coupled between neutral and ground, between said first line and ground, and between said second line and ground. A capacitor and transient suppressor can also be connected between the first and second paths.

In a three phase embodiment, a power conditioner for AC power lines comprises means for coupling to a neutral and first, second and third lines of a three phase AC power source. A first choke is provided in series connection with a capacitor to provide a first path from the first line to neutral. A second choke is provided in series connection with a capacitor to provide a second path from said second line to neutral. The first choke comprises a coil with a winding around the second path. The second choke comprises a coil with a winding around the first path. A third choke is provided in series connection with a capacitor to provide a third path from the third line to neutral. A fourth choke in series connection with a capacitor provides a fourth path from the second line to neutral. The third choke comprises a coil with a winding around the fourth path. The fourth choke comprises a coil with a winding around the third path. A fifth choke in series connection with a capacitor provides a fifth path from the first line to neutral. A sixth choke in series connection with a capacitor provides a sixth path from the third line to neutral. The fifth choke comprises a coil with a winding around the sixth path. The sixth choke comprises a coil with a winding around the fifth path.

The three phase embodiment can further comprise means for coupling a capacitor and a transient suppressor between the first and second lines, between the second and third lines, and between the first and third lines. Means can also be provided for coupling transient suppressors from each of the first, second and third lines to neutral, and from each of the first, second and third lines to ground.

A single phase embodiment is also provided for mounting within an individual AC receptacle. In this embodiment, a choke and capacitor are coupled in series across the receptacle, with the choke having a coil terminating in a line that loops back through the coil. Additional embodiments containing similar chokes are also disclosed.

DETAILED DESCRIPTION OF THE INVENTION

Figure 1:
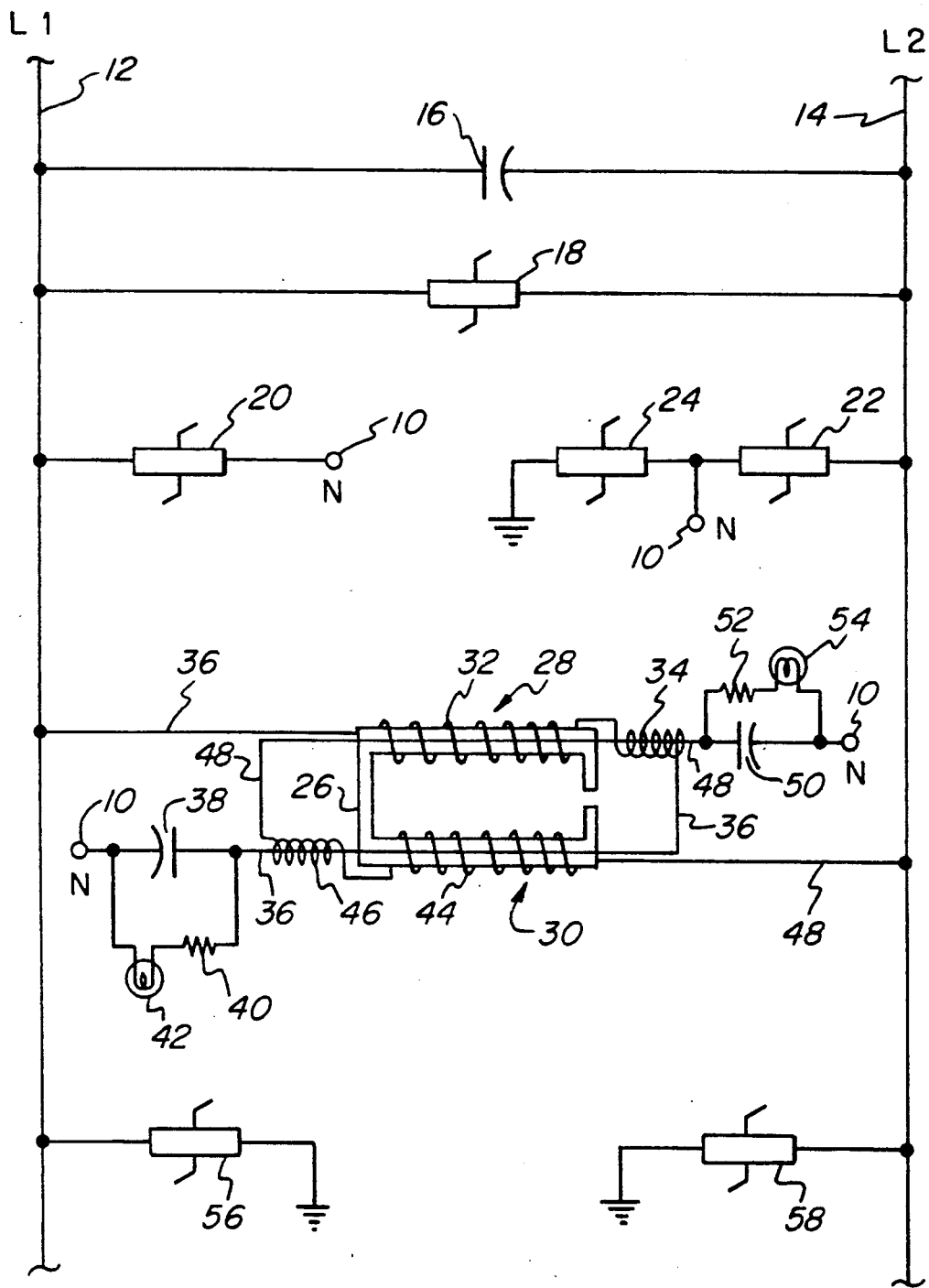
FIG. 1 is a schematic diagram of a two-line single phase embodiment of a power conditioner in accordance with the present invention.

FIG. 1 illustrates a power conditioner circuit in accordance with the present invention for a two-line single phase AC service. For purposes of illustration, lines L1 and L2, designated by reference numerals 12, 14 respectively, can comprise a 220 volt feed. Standard 110 volt power is obtained between each line and a neutral, designated by reference numeral 10.

The power conditioner of the present invention provides both transient and surge protection as well as substantial energy savings. Transient and surge protection is provided by various capacitors and transient suppressors. A capacitor 16 is provided across power lines 12 and 14. Transient suppressors, such as metal oxide varistor ("MOV") devices are placed at various points throughout the circuit. An MOV 18 is placed across incoming power lines 12, 14. An MOV 20 is coupled from incoming line 12 to neutral. MOV 22 is coupled from power line 14 to neutral. MOV 24 is placed between neutral and ground. Additionally, MOVs 56, 58 can be coupled between lines 12, 14 respectively, and ground.

The components of the power conditioner can be provided in a module that is connected to a user's power lines at the service panel. Alternately, the module can be connected to the user's power lines at a load. A plurality of such modules can be provided throughout a commercial establishment or residence. For example, one module can be installed at each fluorescent light fixture in an office building or on each separate line feeding such lighting fixtures. Connections to the module are made at taps on the power lines. There is no need to cut the power lines when installing the module, since none of the components are placed in series with any of the lines.

In order to provide energy savings, a unique inductive arrangement is provided across the AC power lines. The inductor comprises one or more coils, with conductors from the device looping back through the coil(s).

In the single phase embodiment illustrated in FIG. 1, a first path 36 comprises an inductor ("choke") generally designated 28 coupled in series with a capacitor 38. One end of first path 36 is connected to power line 12, and the other end is connected at terminal 10 to neutral.

Similarly, a second path 48 comprises a second choke generally designated 30 coupled in series with a capacitor 50. One end of second path 48 is connected to power line 14, and the other end is coupled to neutral at terminal 10.

Choke 28 in first path 36 comprises a coil having a first portion 32 and a second portion 34. Coil portion 32 is wrapped around a ferromagnetic core 26 and a portion of second path 48. Second coil portion 34 is wrapped around a portion of second path 48, as shown.

Second choke 30 comprises a coil portion 44 wrapped around ferromagnetic core 26 and a portion of first path 36, together with a second coil portion 46 wrapped around first path 36 as shown. Capacitor 38 in the first path is provided with an indicator light 42 connected through a limiting resistor 40 to indicate that capacitor 38 is operating properly and not shorted out. Similarly, capacitor 50 in the second path is provided with an indicator lamp 54 connected through limiting resistor 52.

It has been found that the unique arrangement of chokes 28 and 30 provide substantial savings in power usage, particularly for inductive loads in industrial applications. Such loads include heavy motors and fluorescent lamps. Savings on the order of 10-25% have been measured. It is believed that the savings result from an improvement in power factor provided by chokes 28 and 30. It is also believed that the chokes balance the loads carried by power lines 12 and 14, providing efficiencies in operation. Other mechanisms may also contribute to the energy savings noted.

The measured reduction in energy usage is due, at least in part, to the winding of choke 28 around second path 48 and the winding of choke 30 around first path 36. When this "complementary winding" technique is not used, the energy savings are substantially reduced. It has also been found that ferromagnetic core 26 is not required to achieve the energy savings. The complementary winding technique alone lowers kilowatt hours (KWH), energy usage, and demand rate. Testing has established that energy savings occur even with a choke comprising one winding, as long as the wire from the choke loops back through the winding. Chokes having coils of six windings each have been found to provide maximum efficiency, as the measured reduction in energy savings levels off after six turns.

Figure 2:
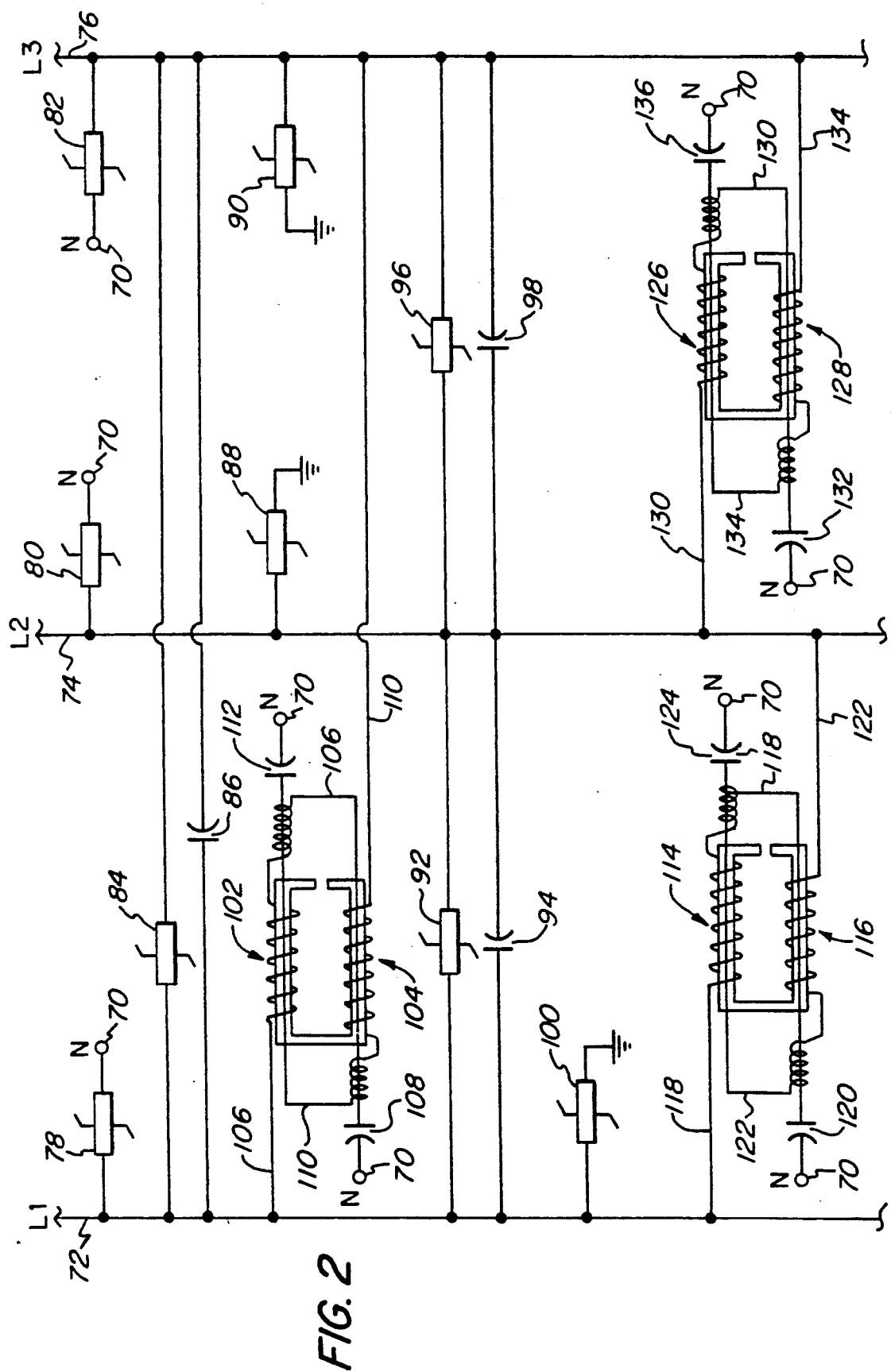
FIG. 2 is a schematic diagram of a three phase embodiment of a power conditioner in accordance with the present invention.

A three phase embodiment of the power conditioner is illustrated in FIG. 2. Again, the power conditioner can be placed at the service panel where incoming power is received from a utility. Additional power conditioners can also be placed at or near significant loads. The power conditioner is coupled to the three incoming power lines L1, L2, L3 represented by reference numerals 72, 74, and 76 respectively, and also to neutral as represented at terminals 70. MOV devices 78, 80 and 82 provide transient suppression from each line to neutral. MOV devices 84, 92 and 96 provide transient suppression between the various power lines. MOV devices 88, 90, and 100 provide transient suppression from each respective line to ground. Capacitors 86, 94 and 98 are coupled between respective power lines to provide filtering and power factor correction.

Chokes 114 and 116 are coupled between lines 72 and 74. Choke 114 and series capacitor 120 provide a first path 118 from line 72 to neutral. Choke 116 and series capacitor 124 provide a second path 122 from line 74 to neutral.

Chokes 126 and 128 are coupled between lines 74 and 76. Choke 128 and series capacitor 136 provide a third path 134 from line 76 to neutral. Choke 126 and series capacitor 132 provide a fourth path 130 from line 74 to neutral.

Chokes 102 and 104 are coupled between lines 72 and 76. Choke 102 and series capacitor 108 provide a fifth path 106 from line 72 to neutral. Choke 104 and series capacitor 112 provide a sixth path 110 from line 76 to neutral.

Figure 3:
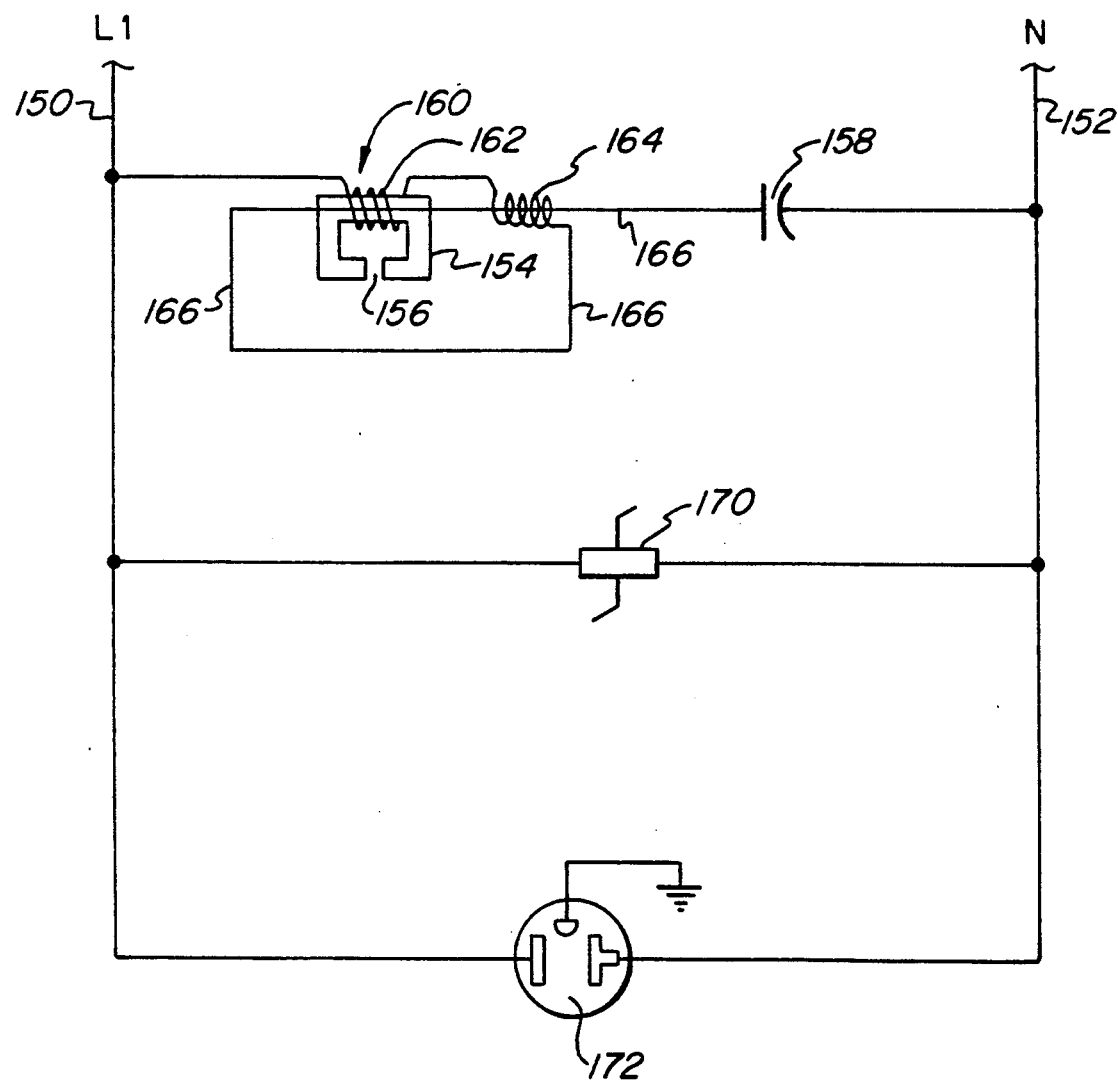
FIG. 3 is a schematic diagram of a single phase embodiment of a power conditioner in accordance with the present invention that can be provided in a single outlet box together with an AC receptacle.

FIG. 3 illustrates an embodiment used in connection with a single phase 120 volt AC receptacle. The circuit of FIG. 3 can be built into a receptacle box or within the receptacle itself for simple installation in a residence. The circuit is coupled between the 120 volt AC line 150 and neutral 152. A choke 160 comprises a first winding 162 around a ferromagnetic core 154. Core 154 includes a gap 156 to prevent saturation thereof during operation of the circuit. Those skilled in the art will appreciate that any of the cores used in connection with the various embodiments of the present invention can contain such a gap. Alternately, as noted above, the core can be eliminated entirely, although use of a core should improve filtering.

Choke 160 also comprises a second winding 164 in series with first winding 162. Coils 162, 164 terminate in a line 166 that loops back through the coils as shown in FIG. 3. Line 166 is coupled in series with a capacitor 158. The series combination of choke 160 and capacitor 158 is coupled across line 150 and neutral 152 of the AC power source.

A varistor or other surge suppressor 170 may be coupled across the AC power source as shown. The line 150 and neutral 152 are coupled to a conventional AC receptacle 172.

Figure 4:
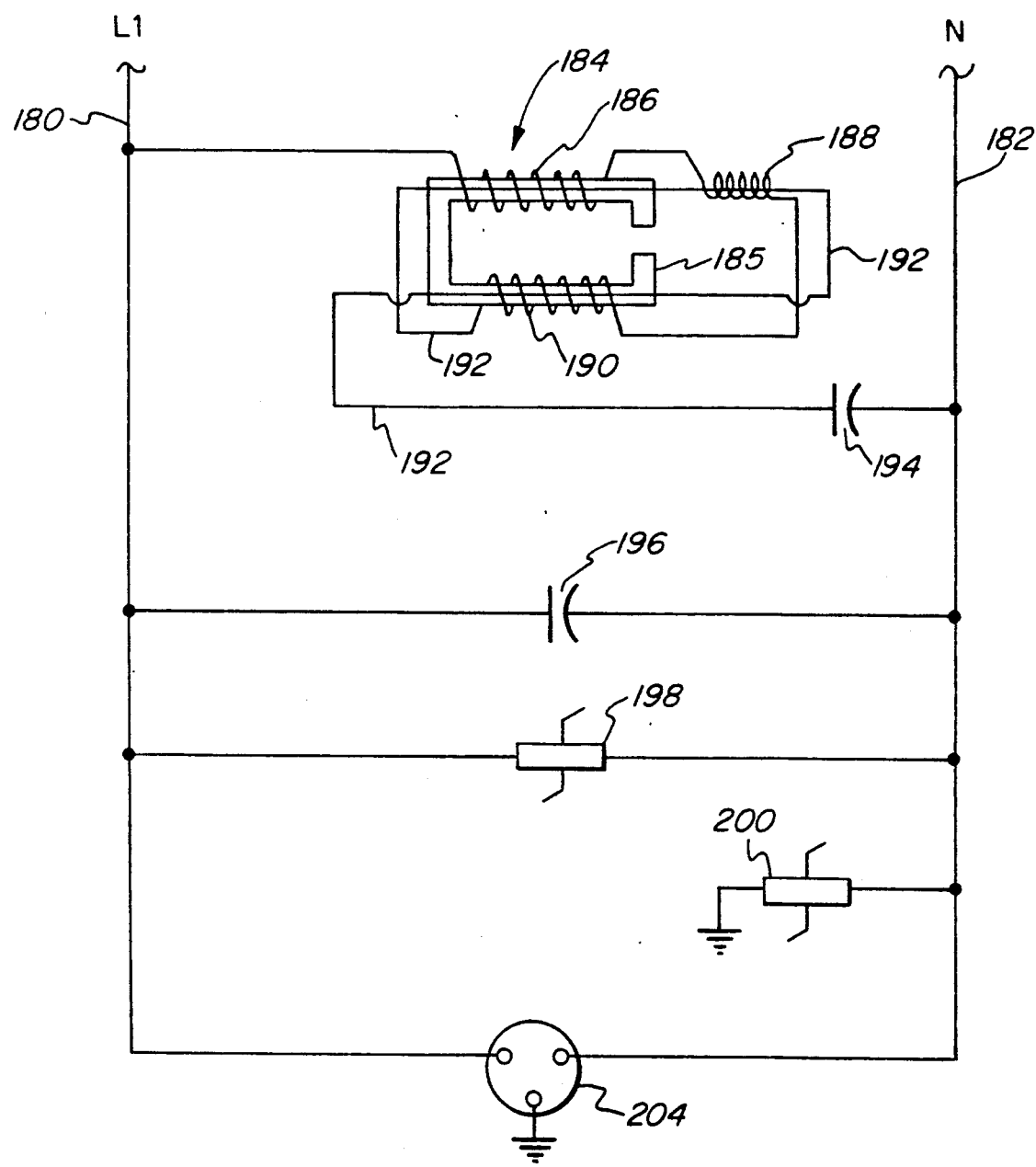
FIG. 4 is a schematic diagram of another single phase embodiment of the present invention.

FIG. 4 illustrates another embodiment in which a choke 184 comprises three windings 186, 188, and 190. First winding 186 is wound around core 185. Second winding 188 is in series with first winding 186 but is not wound around the core. Third winding 190 is in series with second winding 188 and is wound around core 185. A line 192 extending from third winding 190 loops back through the first, second and third windings. A capacitor 194 is coupled to line 192 to form a series connection with choke 184. The series combination of choke 184 and capacitor 194 is coupled between line 180 and neutral 182 of the AC power source. A capacitor 196 and surge suppressor 198 are also coupled across the AC power source. An additional surge suppressor 200 is coupled from neutral to ground. A conventional receptacle 204 is provided across the AC power source as shown.

Figure 5:
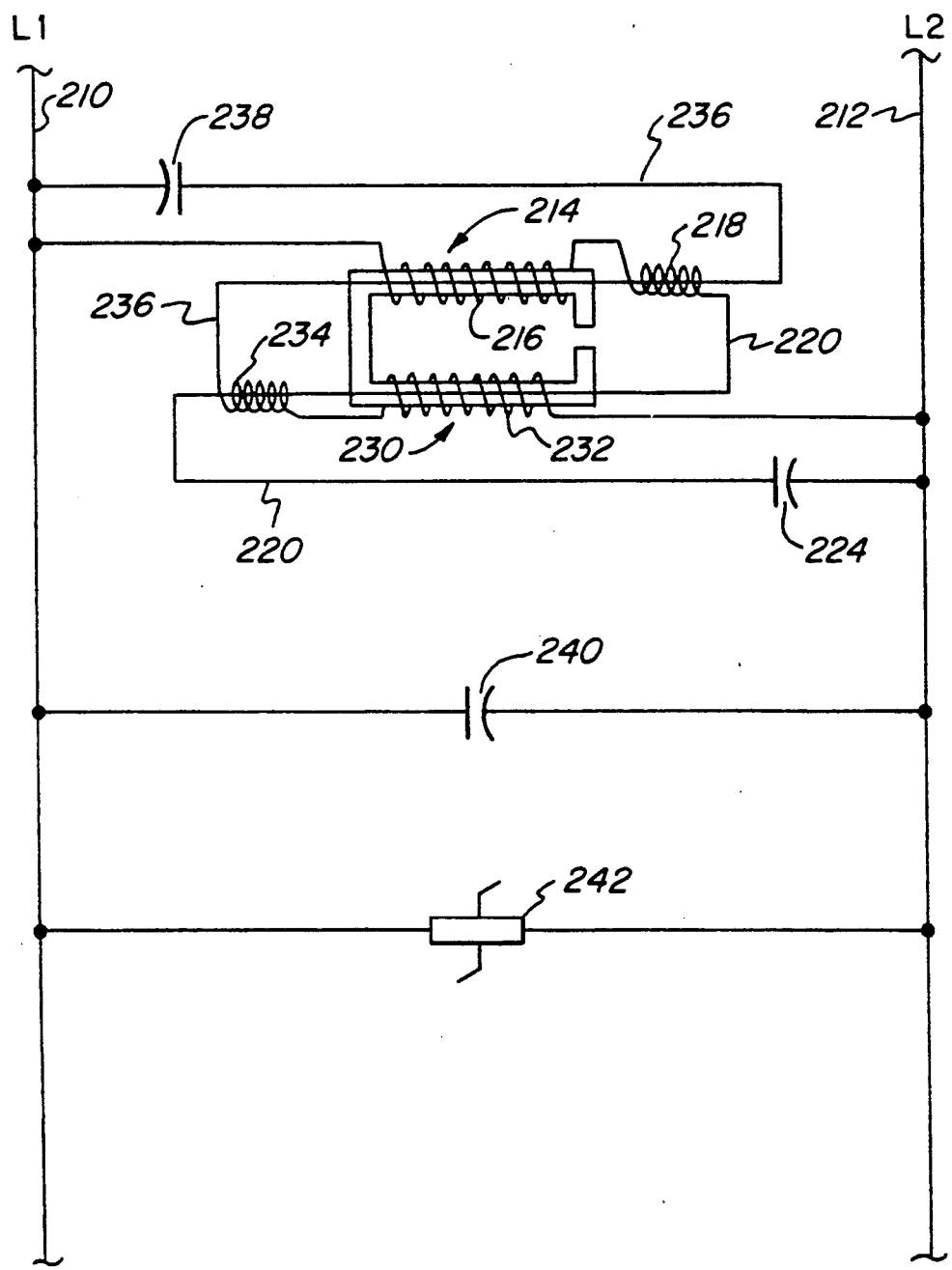
FIG. 5 is a schematic diagram of an alternate embodiment of the present invention that can be provided across the lines of each phase of an AC power source.

In the embodiment shown in FIG. 5, two chokes generally designated 214 and 230 are used. Choke 214 comprises a first winding 216 in series with a second winding 218. The choke terminates in a line 220 that is passed through the windings 232, 234 of choke 230. Line 220 is coupled to a capacitor 224, and the series combination of choke 214 and capacitor 224 is coupled across an AC power source comprising line 210 and line 212. Similarly, choke 230 with line 236 passing through the windings of choke 214 is coupled in series with a capacitor 238. The series combination of choke 230 and capacitor 238 is coupled across the AC power source. A capacitor 240 and surge suppressor 242 are also coupled across the power source. The embodiment of FIG. 5 can be used in a three phase embodiment where an identical configuration of chokes, capacitors, and surge suppressors are provided between line 1 and line 2, line 2 and line 3, and line 1 and line 3.

The various capacitors used in the power conditioners of the present invention are preferably AC/DC power capacitors such as the 97F GEM series manufactured by General Electric Company. Values of 10-25 microfarads are appropriate. The chokes can be wound on snap-on cores such as those available from Radio Shack under Catalog No. 273-104. The coils are wound using wire of a gauge suitable for the current to be drawn by the load. While any number of turns has been found to provide energy savings, five or six turns has generally been found to be appropriate for each coil portion. Adding additional chokes of the types disclosed herein, e.g., at various loads in an industrial or residential setting, increases the energy savings achieved.

It will now be appreciated that the present invention provides AC power conditioners that suppress power line surges and transients as well as provide significant energy savings. Although the invention has been described in connection with various embodiments thereof, those skilled in the art will appreciate that numerous adaptations and modifications may be made thereto without departing from the spirit and scope of the appended claims.

What is claimed is:

1. A power conditioner for AC power lines comprising:

a first path containing a first choke in series with a capacitor;

a second path containing a second choke in series with a capacitor;

means for coupling said first path from a first line of an AC power source to a neutral of said source; and means for coupling said second path from a second line of said source to said neutral;

wherein said first choke comprises a coil with a winding around said second path; and said second choke comprises a coil with a winding around said first path.

2. A power conditioner in accordance with claim 1 further comprising:

a core around which portions of said first and second chokes are wound.

3. A power conditioner in accordance with claim 2 wherein:

said first choke comprises a coil having a first portion wound around said core and said second path, with a second portion wound only around said second path; and said second choke comprises a coil having a first portion wound around said core and said first path, with a second portion wound only around said first path.

4. A power conditioner in accordance with claim 1 further comprising:

means for coupling a capacitor between said first and second lines.

5. A power conditioner in accordance with claim 4 further comprising:

means for coupling a transient suppressor between said first and second lines.

6. A power conditioner in accordance with claim 5 further comprising:

means for coupling a transient suppressor between said first line and neutral; and means for coupling a transient suppressor between said second line and neutral.

7. A power conditioner in accordance with claim 6 further comprising:

means for coupling a transient suppressor between neutral and a ground of said AC power source.

8. A power conditioner in accordance with claim 7 further comprising:

means for coupling a transient suppressor between said first line and ground; and means for coupling a transient suppressor between said second line and ground.

9. A power conditioner for AC power lines comprising:

means for coupling to a neutral, a first line, a second line and a third line of a three phase AC power source;

a first choke in series connection with a capacitor to provide a first path from said line to said neutral;

a second choke in series connections with a capacitor to provide a second path from said second line to said neutral;

said first choke comprising a coil with a winding around said second path;

said second choke comprising a coil with a winding around said first path;

a third choke in series connection with a capacitor to provide a fourth path from said second line to said neutral;

a fourth choke in series connection with a capacitor to provide a fourth path from said second line to said neutral;

said third choke comprising a coil with a winding around said fourth path; and said fourth choke comprising a coil with a winding around said third path.

10. A power conditioner in accordance with claim 9 further comprising:

a fifth choke in series connection with a capacitor to provide a fifth path from said first line to neutral;

a sixth choke in series connection with a capacitor to provide a sixth path from said third line to neutral;

said fifth choke comprising a coil with a winding around said sixth path; and said sixth choke comprising a coil with a winding around said fifth path.

11. A power conditioner in accordance with claim 10 further comprising:

means for coupling a capacitor and a transient suppressor between said first and second lines;

means for coupling a capacitor and a transient suppressor between said second and third lines; and means for coupling a capacitor and a transient suppressor between said first and third lines.

12. A power conditioner in accordance with claim 11 further comprising:

means for coupling transient suppressors from each of said first, second and third lines to neutral.

13. A power conditioner in accordance with claim 12 further comprising:

means for coupling transient suppressors from each of said first, second and third lines to ground.

14. A power conditioner for AC power lines comprising:

a choke;

a capacitor; and means for coupling said choke and capacitor in series across an AC power source;

wherein said choke comprises a coil terminating in a line, and said line loops back through said coil.

15. A power conditioner in accordance with claim 14 further comprising a core around which at least a portion of said coil is wound.

16. A power conditioner in accordance with claim 15 wherein said core has a gap.

17. A power conditioner in accordance with claim 14 further comprising a transient suppressor coupled across said AC power source.

18. A power conditioner in accordance with claim 14 wherein said coil comprises:

a first winding wound around a core;

a second winding in series with said first winding and not wound around said core; and a third winding in series with said second winding and wound around said core;

wherein said line extends from said third winding and loops back through said first, second and third windings.

19. A power conditioner for AC power lines comprising:

a first path containing a first choke in series with a capacitor;

a second path containing a second choke in series with a capacitor;

means for coupling said first path across an AC power source and means for coupling said second path across said AC power source;

wherein said first choke comprises a coil with a winding around said second path; and said second choke comprises a coil with a winding around said first path.

20. A power conditioner in accordance with claim 19 further comprising:

a core around which portions of said first and second chokes are wound.

21. A power conditioner in accordance with claim 20 wherein:

said first choke comprises a coil having a first portion wound around said core and said second path, with a second portion wound only around said second path; and said second choke comprises a coil having a first portion wound around said core and said first path, with a second portion wound only around said first path.

22. A choke for use in an AC power conditioning circuit comprising:

a first coil terminating in a first line; and a second coil terminating in a second line;

wherein said first line passes through said second coil and said second line passes through said first coil.

23. A choke in accordance with claim 22 wherein:

said first coil has a first portion wound around a core and said second line, with a second portion wound only around said second line; and said second coil has a first portion wound around a core and said first line, with a second portion wound only around said first line.

* * * * *